United States Patent [11] 3,573,425

| [72] | Inventor | Lloyd E. Damon |
| | | Wallingford, Conn. |
| [21] | Appl. No. | 846,047 |
| [22] | Filed | July 30, 1969 |
| [45] | Patented | Apr. 6, 1971 |
| [73] | Assignee | Olin Corporation |

[54] WELDING APPARATUS
13 Claims, 5 Drawing Figs.

[52] U.S. Cl. ............................................. 219/125, 228/45
[51] Int. Cl. ............................................. B23k 9/12
[50] Field of Search............................................. 219/124 (PL), 125 (PL), 126, 130, 137; 228/45

[56] References Cited
UNITED STATES PATENTS

| 1,580,020 | 4/1926 | Cutler et al. | 219/125 |
| 2,423,190 | 7/1947 | Kennedy | 219/130 |
| 2,432,495 | 12/1947 | Baird | 219/125 |
| 2,439,740 | 4/1948 | Johnson | 219/125 |
| 2,846,898 | 8/1958 | Cink | 219/125X |
| 2,847,558 | 8/1958 | Mosny | 219/125 |
| 3,201,561 | 8/1965 | Damon | 219/125 |

FOREIGN PATENTS
219,031  5/1968  U.S.S.R. ...................... 219/125

Primary Examiner—J. V. Truhe
Assistant Examiner—L. A. Schutzman
Attorney—Robert H. Bachman, Gordon G. Menzies, Richard S. Strickler, Donald R. Motsko and Thomas P. O'Day ABSTRACT: A semiautomatic welding apparatus which includes a guide wheel assembly, a welding gun carriage assembly and a drive wheel assembly joined together within one unit. The welding gun carriage assembly can be moved from side to side when a turning motion is applied to the welding gun handle. A gear and rack arrangement is used to move the welding gun carriage from side to side as the gun handle is turned. The guide wheel and drive wheel assemblies are pivoted on their axes which are essentially perpendicular to the seam being welded. Turning motion is supplied to these assemblies by tie rods which are attached to these assemblies and the welding gun carriage. By crossing these tie rods as an X, each assembly rotates on its axis in opposite directions, which allows the guide wheel and drive wheel to essentially follow the same path. The lateral movement of the welding gun carriage is proportional to turning moment of the guide and drive wheels with the result that the welding arc path follows the same path as the guide and drive wheels.

INVENTOR:
LLOYD E. DAMON

BY Robert N. Bachman
ATTORNEY

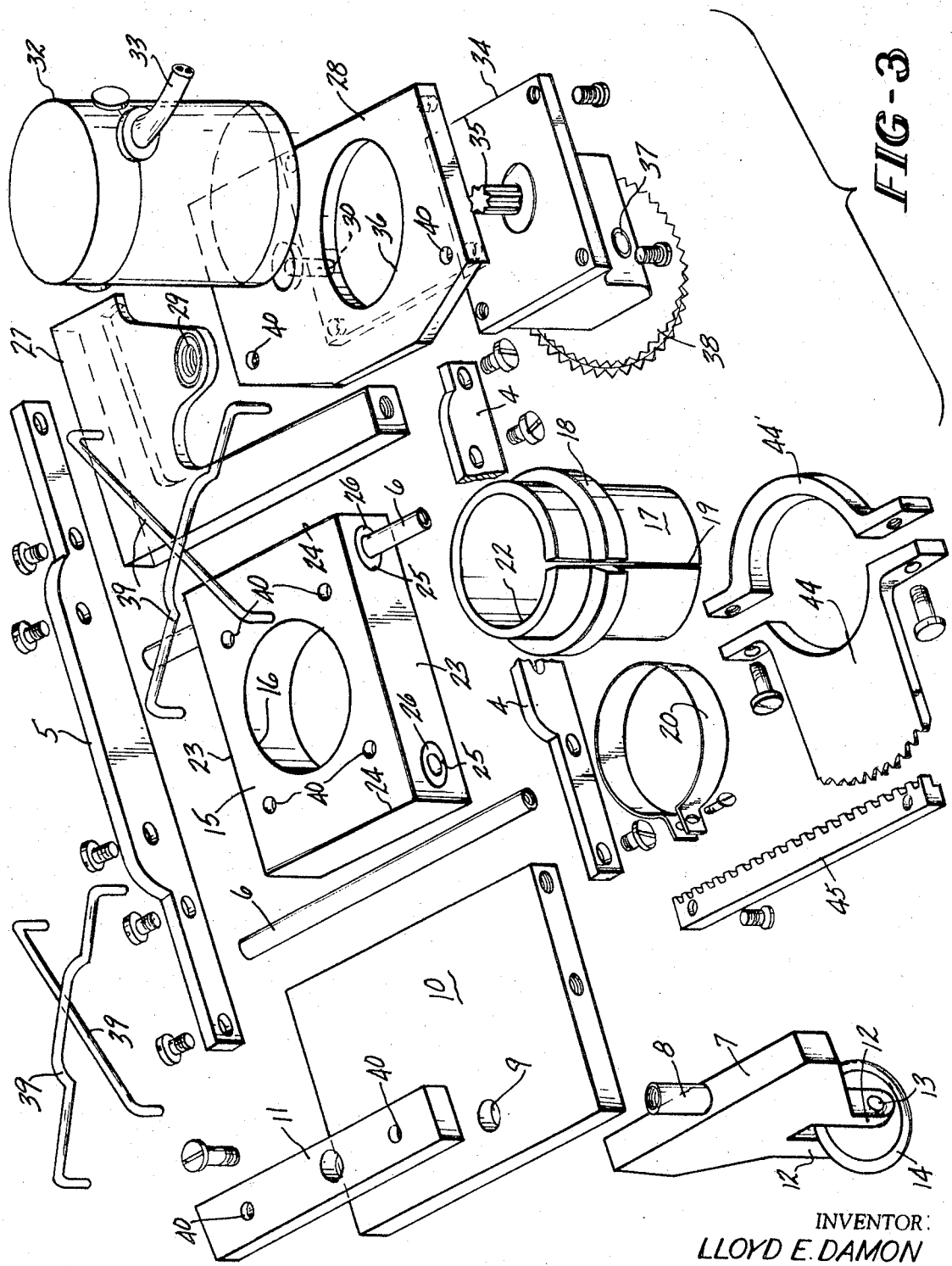

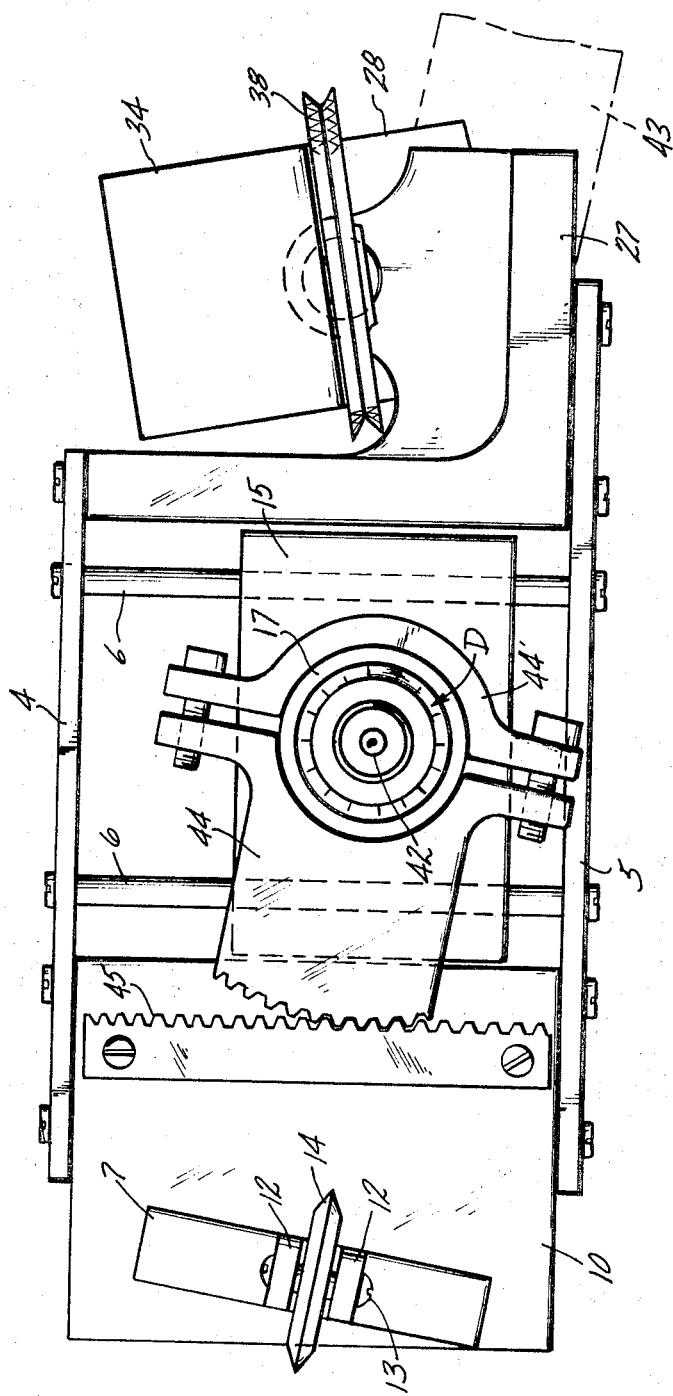

WELDING APPARATUS

The instant invention relates generally to a welding apparatus and more particularly to a steerable semiautomatic welding apparatus for the joining of light gauge sheet aluminum. The invention has particular utility in the welding of seams with complex shapes such as compound curves. It is known that the use of aluminum sheet of relatively small thickness is becoming more prevalent in the construction of structures, such as boats and truck trailers. In the past these sheets of thin material were joined by riveting and the like. The use of welding in such an application was considered inadvisable, because unless it could be performed at a uniform and relatively rapid pace, there could be undesirable concentrations of heat energy, which could burn holes through the thin sheet metal. Automatic welding apparatuses have been available which provide for rapid and controlled rates of welding, but such equipment has been found to be impracticable for use, for one of a kind, and low volume production rounds. This is the case since automatic welding apparatus require complicated tracking and guide means which must be set up for each job.

While hand operated weld guns are available and satisfactory for welds of a very short distance, the use of such guns has been considered to be unsatisfactory for welding long and thin sheets. The operator of such a gun is not able to move it along the joints fast enough, or at a uniform enough rate, so as to prevent burning holes through thin aluminum sheets.

In U.S. Pat. No. 3,201,561 by L. E. Damon, the inventor herein, said patent being assigned to the same assignee as the instant invention, there is disclosed a semiautomatic welding apparatus. This apparatus, as shown in FIG. 1, obviated the above disadvantages with hand operated weld guns and automatic welding apparatus, by providing in combination with a hand operated weld gun, a device which both guides and propels the gun along the joint at the required rate. Thus, the consumable electrode inert gas shielded metal process, referred to hereinafter as the MIG process, could be employed using the apparatus of the patent in welding at a speed as high as 10 feet per minute on a sheet material as thin as 0.040 inch, for welds as long as 30 or 40 feet without stopping. This apparatus disclosed in the aforenoted patent does not satisfactorily negotiate curved seams, or seams which vary from a straight line. In tracking a given line or seam using the apparatus of the patent as shown in FIG. 1 it is imperative that the guide wheel A, the welding gun tip B, and the drive wheel C all follow exactly the same line or seam. The apparatus disclosed in the patent has this ability for straight seams, but not very satisfactory for curved seams. This is so, because the guide wheel is pointed straight ahead while a curved seam leads to the left or to the right of a straight line. Even where the lateral adjustment for the guide wheel disclosed in said patent is employed, it remains very difficult for the operator to maintain the guide wheel, welding gun tip and drive wheel on the same path along the curved seam.

According to the instant invention, it has been found that the above noted disadvantages of the apparatus of U.S. Pat. No. 3,201,561 can be obviated by providing steering means so the apparatus can follow curved seams. The steering is accomplished by rotating the guide and drive wheels, and moving the welding gun tip from side to side, so that they all fall on the same curve of the weld seam. The rotation of the guide and drive wheels and the movement of the welding gun tip from side to side, are tied together in such a manner that a single rotation movement of the welding gun, by the operator, is sufficient to accomplish the desired alignment of these elements along a curved seam.

It is accordingly an object of this invention to provide a semiautomatic weld apparatus for use in welding thin gauge aluminum.

It is a further object of this invention to provide such an apparatus which may be used without complicated gauges, fixtures or tracks.

It is further object of this invention to provide an apparatus which is capable of being steered along a curved or compound curved weld seam.

Other objects will become apparent to those skilled in the art as a detailed discussion of a particular embodiment proceeds with reference to the drawings which form a part hereof, in which:

FIG. 1 is a side elevation view of the prior art welding apparatus of U.S. Pat. No. 3,201,561.

FIG. 3 is an exploded view of the apparatus as shown in FIG. 2. FIG. 4 is a bottom view of the instant welding apparatus.

Figure 1:
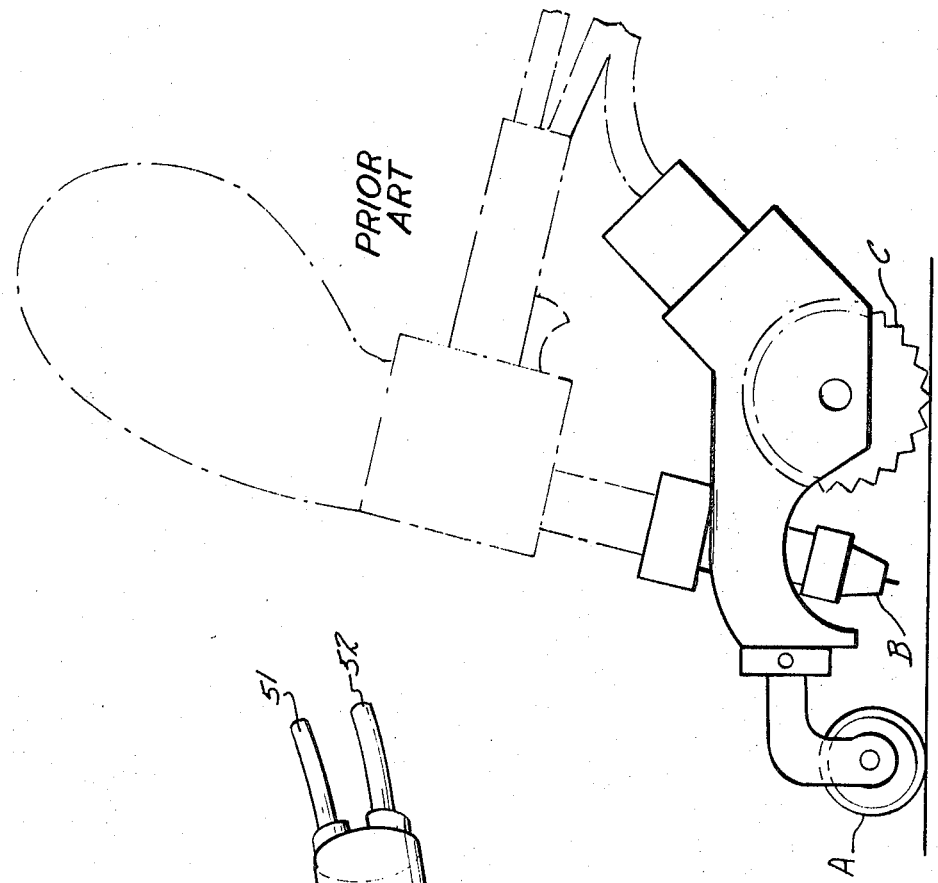
Figure 2:
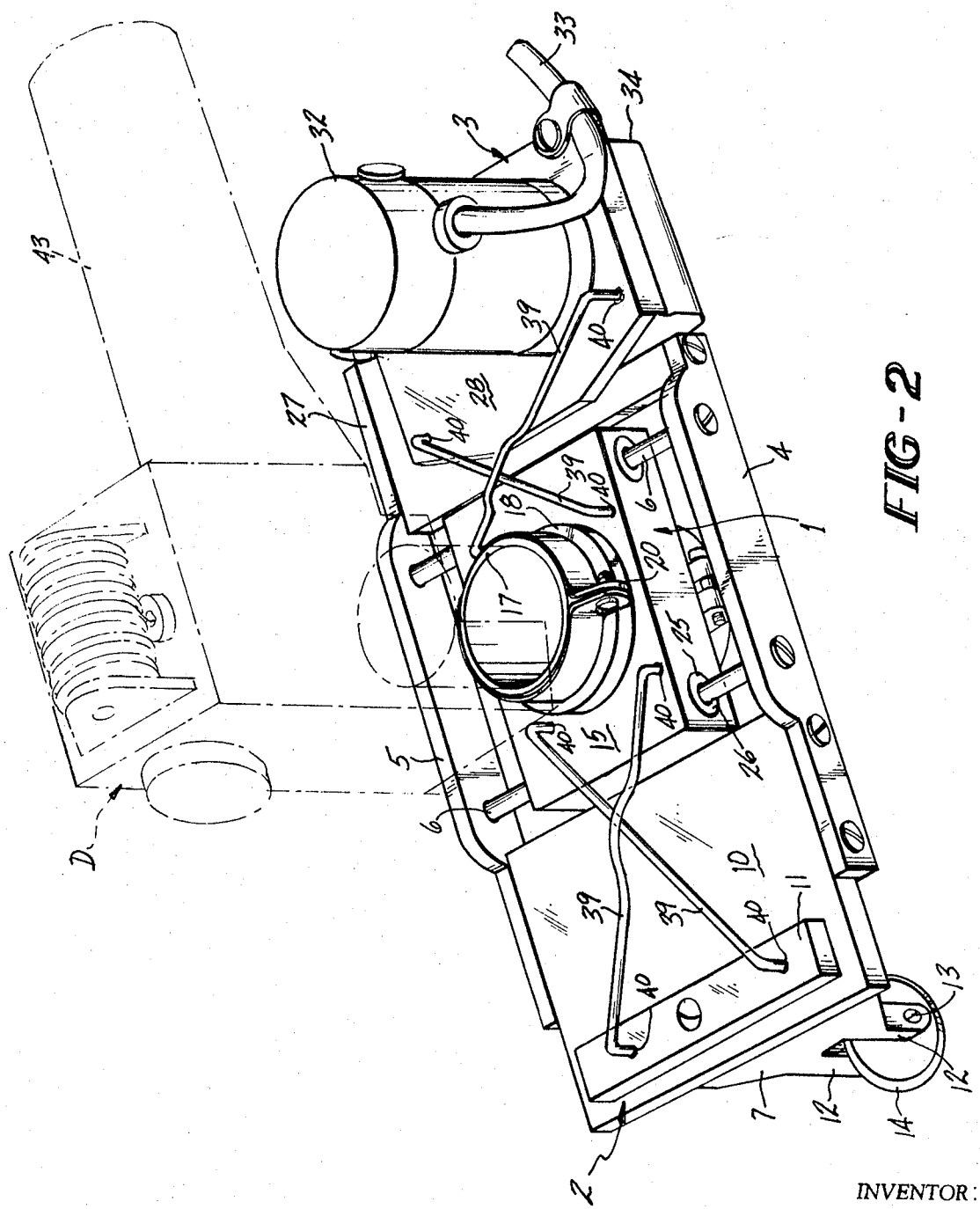
FIG. 2 is a perspective view of the instant apparatus.

Referring now to the drawings, and especially to FIGS. 2 and 3, there is illustrated an apparatus according to this invention. The apparatus comprises a hand operated MIG welding gun shown in phantom in FIG. 2 which is supported in and carried by a carriage assembly 1. The welding gun is of a conventional type, further details of which will be presented later. The apparatus comprises a guide wheel assembly 2, a welding gun carriage assembly 1, and a drive motor assembly 3. The guide wheel assembly 2 and drive motor assembly 3 are joined together by means of side frames 4 and 5. The welding gun carriage assembly 1 rides on parallel traverse rods 6 whose ends are joined to the side frames 4 and 5 as shown in FIG. 1.

The guide wheel assembly 2, referring to FIGS. 2 and 3, comprises a guide wheel housing 7 which has an integral shaft portion 8 which is inserted in rotatable engagement through a hole 9 in the guide wheel chassis 10 for attachment to the steering bar 11. The guide wheel housing 7 includes a pair of split arms 12 between which there is supported an axle 13 for mounting of a guide wheel 14. The steering bar 11 is joined to the integral shaft portion 8 of the guide wheel housing 7 so that it is directly tied to the guide wheel 14, whereby the steering bar 11 and the guide wheel 14 are rotatable as an integral unit with respect to the guide wheel chassis 10.

The carriage assembly 1, referring to FIGS. 2 and 3, comprises a welding gun platen 15 which has a cylindrical hole 16 into which an insulated bushing 17 fits. The insulated bushing 17 comprises a collar portion 18 and its split along 19, so as to provide means for clamping the welding gun to the welding gun platen 15. A clamp 20 is positioned above the collar 20 is effective to compress the split insulated bushing 17 so that the bushing 17 tightly surrounds and engages the welding gun, thereby clamping it in place. The split insulated bushing 17 and clamp 20 subassembly is inserted in rotatable engagement in the cylindrical hole 16 in the welding gun platen 15. The welding gun may then be inserted in the cylindrical hole 22 in the insulated bushing 17 and clamped in place by means of the clamp 20 and is thereby in rotatable engagement with the welding gun platen 15. The welding gun platen 15 comprises a rectangular block having side portions 23 and edge portions 24. The platen 15 has at least two holes 25 which extend from one side 23 to the other 23 and which are parallel and near to its opposite edges 24. Inserted in these holes are ball bushings 26 which are capable of providing relatively easy movement in a direction parallel to the axis of the holes 25. The platen 15 as just described, rides on traverse rods 6 which are inserted through the ball bushings 26 and which are secured at their opposite ends to the side frames 4 and 5 so as to provide for lateral movement of the carriage assembly 1 from one side frame 4 to the other 5, and visa versa.

The drive motor assembly 3, referring to FIGS. 2 and 3, comprises a drive motor chassis 27 to which a pivotable motor mounting platen 28 is rotatably engaged by suitable means. Said means may comprise, a bearing 29 which is embedded and joined to the drive motor chassis 27 and which engages a shaft portion 30 of the pivotable motor mounting platen 28. An adjustable-speed-drive motor 32 is mounted to the top of the motor mounting platen 28. Such a motor 32, may be of any conventional type, for example that obtainable from Universal Electric Company, Model 7—039. Electric power for the motor 32 is supplied through a suitable cable 33 extending from an external circuit not shown. A gear box 34 which has an input drive shaft 35 for engagement with the motor 32 is mounted to the underside of the pivotable platen 28, whereby the input drive shaft 35 extends through hole 36 in the pivotable platen 28, and engages the motor 32. An output drive shaft 37 extends out (not shown) from said gear box at right angles to the input drive shaft 35 and engages the drive wheel 38 as its axle.

The guide wheel assembly 2, drive motor assembly 3, and welding gun carriage assembly 1 are all joined together to form the welding apparatus by means of the side frames 4 and 5 as aforenoted. As so joined the guide wheel 14 and drive wheel 38 are rotatable about axes essentially perpendicular to the seam to be welded, and the welding gun carriage assembly 1 is movable from side to side along the traverse rods 6.

It is one of the essential requirements of the instant invention that the rotation of the guide wheel 14 and drive wheel 38 along the axes perpendicular to the seam to be welded are linked or tied in some manner to the lateral movement of the welding gun carriage assembly 1. An example of a suitable means for so linking the respective movements of the respective assemblies is shown in FIG. 2. Turning motion is supplied to the guide wheel 14 and drive wheel 38 by the tie rods 39 which are attached to the steering bar 11, and pivotable platen 28 respectively, and to the welding gun platen 15. By crossing these tie rods as an X, the guide wheel 14 and drive wheel 38 rotate on their axes in opposite directions, which allows the guide wheel 14 and the drive wheel 38 to essentially follow the same path. The lateral movement of welding gun platen 15 is proportional to the turning moment of the guide and drive wheel 14, 38 with the result that the welding gun path follows the same path as the guide and drive wheels 14, 38. The tie rods 39 may comprise any suitable configuration, such as shown in FIGS. 2 and 3. As shown therein, the rods 39 have end portions which are bent at right angles for insertion into the holes 40 in the steering bar 11, gun platen 15 and pivotable platen 28. As so inserted, the ends of the tie rods 39 are free to move and rotate within the respective holes 40. The positioning of the holes 40 into which the tie rod ends 39 are inserted, and the lengths of the individual tie rods 39 are preselected, such that, when the welding gun carriage assembly 1 is in the center of its field of travel, the guide wheel 14, welding gun tip 42 (FIG. 4), and drive wheel 38 will all fall along the same straight line path. Obviously, the apparatus may include means for adjusting the length of the tie rods 39, or the position at which the tie rods are secured, so as to provide for adjustable alignment. In practice, however, it is sufficient if the lengths of the tie rods 39 and the position of the holes 40 into which they are inserted is accurately fixed when manufacturing the apparatus. While the embodiment just discussed relies on the insertion of a rodlike tie 39 in suitable holes 40 of the parts to be tied together 11, 15, 28, other means for securing the tie rods in moveable engagement between the various parts are possible and would occur to one of ordinary skill in the art.

It is also one of the desired objects of this invention to provide a simple and controllable means for moving the welding gun platen 15 laterally back and forth along the traverse rods 6 so as to align the guide wheel 14, drive wheel 38, and welding gun tip 42 in FIG. 4, along the same curved path. Referring to FIG. 4, movement of the welding gun platen 15 is obtained by turning the welding gun handle 43, shown in FIG. 5 and in phantom in FIG. 4, in a clockwise direction for a curve going to the right, and in a counterclockwise direction for a curve going to the left. The welding gun D is clamped in the insulated bushing 17 as aforenoted. The movement of the carriage assembly 1 along the traverse rods 6 is obtained by means of a gear 44 and rack 45 assembly. The gear 44 is clamped 44' to the insulating bushing 17 which in turn is clamped around the welding gun D. As previously described, the welding gun D and insulating bushing 17 are rotatable with respect to the welding gun platen 15. Therefore, by clamping the gear 44 to the insulated bushing and welding gun D they are rotatable as an integral unit, with respect to the welding gun platen 15. The gear 44 engages the rack 45 which is mounted to the bottom with the guide wheel chassis 10. In operation when the welding gun handle 43 is rotated in a clockwise or counterclockwise direction, the gear 44 moves along the rack 45 and thereby propels the welding gun carriage assembly 1 along the traverse rods 6. FIG. 4 shows the position of the gear 44 and gun carriage assembly 1 when the gun handle 43 is turned in the counterclockwise direction. This results in movement of the assembly toward frame 5. This movement of the carriage assembly 1 causes the tie rods 39 previously described to rotate the guide wheel 14 and drive wheel 38 as shown in FIG. 4, such that the guide wheel 14, weld gun tip 42 and drive wheel 38 fall along the same curved path.

Therefore, in operation when the gun handle 43 is moved in either direction, the gun platen 15 will move in a corresponding direction on its traverse rods 6. The crossed tie rods 39 connected to the fore and aft sections of the gun platen 15 will cause the guide wheel 14 and drive wheel 38 to rotate on their axes each in a different direction. The amount the gun handle 43 is turned will determine the diameter of the curve which the apparatus will follow.

As will be obvious to those skilled in the art, various materials may be employed in the construction of the instant weld apparatus. It has been found best to construct the guide wheel of a strong polymer such as Teflon, and the drive wheel of a knurled steel roll.

The guide wheel 14 may have any desired cross section wherein its periphery is useful in following the weld seam, although preferably the periphery should have a configuration mating with said seam. Thus, it may have a beveled edge as shown in the drawings or it may have a rounded or a flat edge. Similarly, the drive wheel 38 may have any desired cross section wherein its periphery is useful in driving the apparatus along the weld seam. It may be smooth or serrated although the latter is preferred. It may have, for example, a beveled, curved or flat edge or it may have a semicircular or V-shaped channel type edge such as shown in FIG. 4. It is preferred that the guide wheel 14 have the beveled edge shown in FIG. 4 and the drive wheel 38 have the serrated and V-shaped channel type edge as shown in the figure. The guide and drive wheels 14, 38 are easily interchangeable with other guide and drive wheels respectively.

Figure 5:
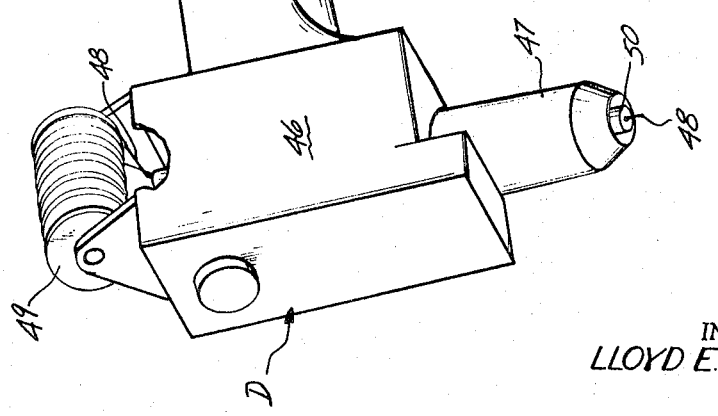
FIG. 5 is a side elevation view of an exemplary welding gun.

FIG. 5. shows schematically, a suitable welding gun for use with the apparatus of this invention. The gun comprises a handle portion 43, a body 46, and a shaft 47. The welding wire 48 is fed from a coil 49 through the body 46 and the shaft 47 exiting at the welding tip 50. The arc is struck between the wire at the tip 50 and the weld seam. The welding gun is assembled to the instant welding apparatus by clamping the shaft 47 within the insulating bushing 17 which rotatably engages the gun platen 15. The point corresponding for purposes of alignment to the arc path, is the welding tip 50 so that in use the tip 50 will be aligned with the guide and drive wheels 14, 38 along the same curved seam, as shown in FIG. 4. The inert gas is supplied to the gun through the tube 51 and the power is supplied to the gun through the electric cable 52. Welding is commenced by squeezing trigger means 53.

The welding parameters of power, gas flow, and traversing speed, will obviously depend on the material being welded and on the type of gun and filler wire used. For example, in welding aluminum from 0.040 inch to approximately 0.125 inch, a MIG gun which uses a 1-lb. coil of wire is recommended. In welding material heavier than 0.125 inch, a water cooled gun, which uses a 10-lb. coil, will produce the best results. Usually, 0.030-inch diameter wire is recommended for the 1-lb. gun, but in certain conditions, one might use 0.048-inch diameter, or 0.062-inch diameter filler wire can be used.

By appropriate external control means, it will be appreciated that power to the drive motor and power to the welding gun may be coordinated with the supply of inert gas and filler wire, to achieve the desired and required relationship between the weld rate and the rate of travel of the weld apparatus upon the seam to be welded.

A typical example of the operation of the instant apparatus will now be briefly described. When power is supplied to the drive motor 32, the knurled drive wheel 38 grips the surface of the weld seam and drives the entire welding apparatus along the seam. The apparatus is guided along the seam by the guide wheel 14. The welding gun D has been clamped in rotatable engagement in the gun platen 15 such that its tip 50 is at the desired height above the weld seam. The gun tip may be spaced above the seam to be welded by appropriately positioning the shaft 47 of the welding gun D and securing same within the insulated collar 17. The desired power and gas input to the welding gun D may be coordinated by a control unit external to the welding apparatus. By depressing the trigger 53, of the welding gun D, the unit is activated and proceeds along the seam to be welded. The operator may negotiate a curved seam by merely turning the weld gun handle 43 to the left or to the right a desired amount as the direction and diameter of the curved seam demands. It is obvious that the type of material being welded and its thickness will dictate the appropriate welding parameters, such as current and voltage, as well as travel rate of the weld apparatus.

The welding apparatus which has been disclosed is extremely easy to operate. After appropriately setting the welding parameters as discussed above, the operator need only to press the trigger of the weld gun to put it in operation. By means of the instant apparatus, curved seams may be accurately traversed with a minimum of operator skill. While the apparatus has been discussed with respect to MIG welding, other welding techniques may be equally useful with the instant apparatus.

The foregoing discussion has dealt with the most preferred embodiment of the invention as shown in FIGS. 2 to 4. This embodiment provides for rapidly and controllably welding thin sheet aluminum, and is believed to provide a solution to the aforenoted problems and achieve the aforementioned objectives. In another embodiment, useful where the welding requirements permit, the inventive apparatus might provide for rotation of only the guide wheel or drive wheel assemblies with tying means connecting only the rotatable assembly to the welding gun carriage assembly. Such an apparatus could be used where the curvature of the weld seam is not so great as to cause the welding arc to depart from the seam. This modification could be obtained with the apparatus of FIGS. 2 to 4, by simply removing the tie rods 39 connecting the guide wheel assembly 2 or the drive wheel assembly 3 with the carriage assembly 1 and locking the respective assembly in a position, wherein it is aligned for welding a straight seam.

Other suitable modifications are possible, and it is intended that the invention encompass all such modifications which are within the spirit and scope of the invention, as set forth herein. It is to be understood that the invention is not to be limited to the illustrations described and shown herein, which are deemed to be merely illustrative of the best mode of carrying out the invention, and which are suitable of modification of form, size, arrangement of parts and details of operation.

I claim:

1. A semiautomatic welding apparatus comprising:
   a frame;
   guide wheel means connected to said frame, for guiding said apparatus along a seam which is to be welded;
   drive wheel means connected to said frame, for propelling said apparatus along the seam at a controlled rate;
   welding means rotatably connected to said frame, being operative to weld the seam;
   at least one of said guide wheel means and said drive wheel means being rotatable about an axis substantially perpendicular to the seam; and
   connecting means, connecting said rotatable welding means and said at least one of said guide wheel means and said drive wheel means, said connecting means being operative to rotate said at least one of said guide wheel means and said drive wheel means, an amount proportional to a given rotation of said welding means; whereby the guide wheel means, welding means and drive wheel means follow a substantially common path along the seam.

2. A semiautomatic welding apparatus comprising:
   a frame;
   carriage means, connected to said frame, adapted to be positioned adjacent to a seam to be welded;
   welding means being operative to weld the seam, said welding means being secured in rotatable engagement to said carriage means;
   actuating means, connected to said carriage means, and operative to move said carriage means laterally in a direction substantially transverse to the seam an amount proportional to a given rotation of said welding means;
   guide wheel means, connected to said frame, for guiding said apparatus along the seam;
   drive wheel means, connected to said frame, for propelling said apparatus along the seam at a controlled rate;
   at least one of said guide wheel means and said drive wheel means, being rotatable about an axis substantially perpendicular to the seam; and
   tying means, connecting said at least one of said guide wheel means and said drive wheel means to said carriage means, said tying means being operative to rotate said at least one of said guide wheel means and said drive wheel means, an amount proportional to a given lateral movement of said carriage means; whereby the guide wheel means, welding means and drive wheel means follow a substantially common path along the seam.

3. A semiautomatic welding apparatus as in claim 2 wherein said welding means is a MIG welding gun.

4. A semiautomatic welding apparatus as in claim 3 wherein said guide wheel means comprises a housing connected to said frame, a guide wheel supported in said housing, said guide wheel having a periphery of a configuration mating with the seam.

5. A semiautomatic welding apparatus as in claim 4 wherein said actuating means comprises a toothed gear connected to said welding means which is intermeshed with a toothed rack connected to said frame whereby rotation of the welding means results in a proportional lateral movement of said carriage means.

6. A semiautomatic welding apparatus as in claim 5 wherein the drive wheel means comprises a platen connected to said frame, a motor connected to said platen and a drive wheel connected to said motor, said drive wheel being knurled for biting engagement with the surface at the seam.

7. A semiautomatic welding apparatus as in claim 6 wherein the typing means comprises two tie rods connecting said guide wheel means to said carriage means or two tie rods connecting said drive wheel means to said carriage means, said tie rods being in crossed relationship.

8. A semiautomatic welding apparatus comprising:
   a frame;
   carriage means, connected to said frame, adapted to be positioned adjacent to a seam to be welded;
   welding means being operative to weld the seam, said welding means being secured in rotatable engagement to said carriage means;
   actuating means, connected to said carriage means, and operative to move said carriage means laterally in a direction substantially transverse to the seam an amount proportional to a given rotation of said welding means;
   guide wheel means connected to said frame, for guiding said apparatus along the seam, said guide wheel means being rotatable about an axis substantially perpendicular to the seam;
   drive wheel means, connected to said frame, for propelling said apparatus along the seam at a controlled rate, said drive wheel means being rotatable about an axis substantially perpendicular to the seam; and
   tying means, connecting each of said guide wheel means and said drive wheel means to said carriage means, said tying means being operative to rotate said guide wheel means and said drive wheel means, each in a different direction, an amount proportional to a given lateral movement of said carriage means; whereby the guide wheel means, welding means, and drive wheel means follow a substantially common path along the seam.

9. A semiautomatic welding apparatus as in claim 8 wherein said welding means is a MIG welding gun.

10. A semiautomatic welding apparatus as in claim 9 wherein said guide wheel means comprises a housing rotatably connected to said frame, a guide wheel supported in said housing, said guide wheel having a periphery of a configuration mating with the seam.

11. A semiautomatic welding apparatus as in claim 10 wherein said actuating means comprises a toothed gear connected to said welding means which is intermeshed with a toothed rack connected to said frame whereby rotation of the welding means results in a proportional lateral movement of said carriage means.

12. A semiautomatic welding apparatus as in claim 11 wherein the drive wheel means comprises a platen rotatably connected to said frame, a motor connected to said platen and a drive wheel connected to said motor, said drive wheel being knurled for biting engagement with the surface at the seam.

13. A semiautomatic welding apparatus as in claim 12 wherein the tying means comprises two tie rods connecting said guide wheel means to said carriage means and two tie rods connecting said drive wheel means to said carriage means, said tie rods being in crossed relationship.